(12) United States Patent
Takeda

(10) Patent No.: US 10,670,985 B2
(45) Date of Patent: Jun. 2, 2020

(54) IMAGE FORMING APPARATUS

(71) Applicant: CANON KABUSHIKI KAISHA, Tokyo (JP)

(72) Inventor: Shoji Takeda, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 23 days.

(21) Appl. No.: 16/200,459

(22) Filed: Nov. 26, 2018

(65) Prior Publication Data
US 2019/0171129 A1 Jun. 6, 2019

(30) Foreign Application Priority Data

Dec. 1, 2017 (JP) .................... 2017-231518

(51) Int. Cl.
| | |
|---|---|
| B41J 2/435 | (2006.01) |
| B41J 2/47 | (2006.01) |
| G03G 15/04 | (2006.01) |
| G06T 5/00 | (2006.01) |
| H04N 1/193 | (2006.01) |
| H04N 1/195 | (2006.01) |
| G06T 7/00 | (2017.01) |
| G03G 15/041 | (2006.01) |

(52) U.S. Cl.
CPC ........ *G03G 15/04072* (2013.01); *B41J 2/435* (2013.01); *B41J 2/47* (2013.01); *G03G 15/0415* (2013.01); *G06T 5/001* (2013.01); *G06T 7/0002* (2013.01); *H04N 1/1937* (2013.01); *H04N 1/19589* (2013.01)

(58) Field of Classification Search
None
See application file for complete search history.

(56) References Cited

U.S. PATENT DOCUMENTS

| 7,777,776 | B2 | 8/2010 | Horiuchi ................. 347/247 |
| 8,619,107 | B2 | 12/2013 | Imai et al. ............... 347/238 |
| 2007/0139746 | A1* | 6/2007 | Akamatsu ............ G02B 26/123 359/204.2 |
| 2009/0142084 | A1* | 6/2009 | Nakahata ............. G03G 15/011 399/51 |
| 2016/0246209 | A1* | 8/2016 | Watanabe ............ G03G 15/043 |

FOREIGN PATENT DOCUMENTS

| JP | 2004-338280 | 12/2004 |
| JP | 2005-238584 | 9/2005 |

* cited by examiner

*Primary Examiner* — Scott A Richmond
(74) *Attorney, Agent, or Firm* — Venable LLP

(57) ABSTRACT

An image forming apparatus includes a photosensitive member, a light source, a deflecting unit, a storing unit, a correcting unit, and a light source driving portion. Magnification correction data is determined using a quadratic function of a variable representing a scanning position with respect to a scanning direction. Coefficients of two quadratic functions corresponding to adjacent two regions included in a plurality of scanning regions are set so that a differential value calculated at the variable corresponding to a boundary of the two regions by a differential of the quadratic function for one region and a differential value calculated at the variable corresponding to the boundary of the two regions by a differential of the quadratic function for the other region are equal to each other.

9 Claims, 15 Drawing Sheets

| SIZE | 200 | |
|---|---|---|
| D | WL | B | WR |
| 0 | 100 | 0 | 100 |
| 1 | 94 | 13 | 93 |
| 2 | 87 | 27 | 86 |
| 3 | 80 | 40 | 80 |
| 4 | 74 | 53 | 73 |
| 5 | 67 | 67 | 66 |
| 6 | 60 | 80 | 60 |
| 7 | 54 | 93 | 53 |
| 8 | 47 | 107 | 46 |
| 9 | 40 | 120 | 40 |
| 10 | 34 | 133 | 33 |
| 11 | 27 | 147 | 26 |
| 12 | 20 | 160 | 20 |
| 13 | 14 | 173 | 13 |
| 14 | 7 | 187 | 6 |
| 15 | 0 | 200 | 0 |

| SIZE | 201 | |
|---|---|---|
| D | WL | BL | WR |
| 0 | 101 | 0 | 100 |
| 1 | 94 | 13 | 94 |
| 2 | 87 | 27 | 87 |
| 3 | 81 | 40 | 80 |
| 4 | 74 | 54 | 73 |
| 5 | 67 | 67 | 67 |
| 6 | 61 | 80 | 60 |
| 7 | 54 | 94 | 53 |
| 8 | 47 | 107 | 47 |
| 9 | 40 | 121 | 40 |
| 10 | 34 | 134 | 33 |
| 11 | 27 | 147 | 27 |
| 12 | 20 | 161 | 20 |
| 13 | 14 | 174 | 13 |
| 14 | 7 | 188 | 6 |
| 15 | 0 | 201 | 0 |

| SIZE | 230 | |
|---|---|---|
| D | WL | B | WR |
| 0 | 115 | 0 | 115 |
| 1 | 108 | 15 | 107 |
| 2 | 100 | 31 | 99 |
| 3 | 92 | 46 | 92 |
| 4 | 85 | 61 | 84 |
| 5 | 77 | 77 | 76 |
| 6 | 69 | 92 | 69 |
| 7 | 62 | 107 | 61 |
| 8 | 54 | 123 | 53 |
| 9 | 46 | 138 | 46 |
| 10 | 39 | 153 | 38 |
| 11 | 31 | 169 | 30 |
| 12 | 23 | 184 | 23 |
| 13 | 16 | 199 | 15 |
| 14 | 8 | 215 | 7 |
| 15 | 0 | 230 | 0 |

| SIZE | 259 | |
|---|---|---|
| D | WL | B | WR |
| 0 | 130 | 0 | 129 |
| 1 | 121 | 17 | 121 |
| 2 | 112 | 35 | 112 |
| 3 | 104 | 52 | 103 |
| 4 | 95 | 69 | 95 |
| 5 | 87 | 86 | 86 |
| 6 | 78 | 104 | 77 |
| 7 | 69 | 121 | 69 |
| 8 | 61 | 138 | 60 |
| 9 | 52 | 155 | 52 |
| 10 | 43 | 173 | 43 |
| 11 | 35 | 190 | 34 |
| 12 | 26 | 207 | 26 |
| 13 | 18 | 224 | 17 |
| 14 | 9 | 242 | 8 |
| 15 | 0 | 259 | 0 |

| SIZE | 260 | |
|---|---|---|
| D | WL | B | WR |
| 0 | 130 | 0 | 130 |
| 1 | 122 | 17 | 121 |
| 2 | 113 | 35 | 112 |
| 3 | 104 | 52 | 104 |
| 4 | 96 | 69 | 95 |
| 5 | 87 | 87 | 86 |
| 6 | 78 | 104 | 78 |
| 7 | 70 | 121 | 69 |
| 8 | 61 | 139 | 60 |
| 9 | 52 | 156 | 52 |
| 10 | 44 | 173 | 43 |
| 11 | 35 | 191 | 34 |
| 12 | 26 | 208 | 26 |
| 13 | 18 | 225 | 17 |
| 14 | 9 | 243 | 8 |
| 15 | 0 | 260 | 0 |

FIG.5

|  | time(μs) |
|---|---|
| BD | 0.000 |
| sns0 | 20.919 |
| sns1 | 31.873 |
| sns2 | 43.155 |
| sns3 | 54.757 |
| sns4 | 66.673 |
| sns5 | 78.891 |
| sns6 | 91.398 |
| sns7 | 104.176 |
| sns8 | 117.206 |
| sns9 | 130.465 |
| sns10 | 143.925 |
| sns11 | 157.559 |
| sns12 | 171.334 |
| sns13 | 185.218 |
| sns14 | 199.175 |
| sns15 | 213.169 |
| sns16 | 227.163 |
| sns17 | 241.120 |
| sns18 | 255.004 |
| sns19 | 268.780 |
| sns20 | 282.413 |
| sns21 | 295.874 |
| sns22 | 309.132 |
| sns23 | 322.162 |
| sns24 | 334.940 |
| sns25 | 347.447 |
| sns26 | 359.665 |
| sns27 | 371.581 |
| sns28 | 383.184 |
| sns29 | 394.465 |
| sns30 | 405.419 |
| sns31 | 416.044 |

FIG.8

|  | time($\mu$s) |
|---|---|
| ts | 20.919 |
| t0 | 10.954 |
| t1 | 11.281 |
| t2 | 11.603 |
| t3 | 11.916 |
| t4 | 12.218 |
| t5 | 12.507 |
| t6 | 12.778 |
| t7 | 13.030 |
| t8 | 13.258 |
| t9 | 13.460 |
| t10 | 13.634 |
| t11 | 13.776 |
| t12 | 13.884 |
| t13 | 13.957 |
| t14 | 13.994 |
| t15 | 13.994 |
| t16 | 13.957 |
| t17 | 13.884 |
| t18 | 13.776 |
| t19 | 13.634 |
| t20 | 13.460 |
| t21 | 13.258 |
| t22 | 13.030 |
| t23 | 12.778 |
| t24 | 12.507 |
| t25 | 12.218 |
| t26 | 11.916 |
| t27 | 11.603 |
| t28 | 11.281 |
| t29 | 10.954 |
| t30 | 10.625 |

FIG.9

|   | M |
|---|---|
| $M_0$ | 0.81609 |
| $M_1$ | 0.85470 |
| $M_2$ | 0.88019 |
| $M_3$ | 0.90527 |
| $M_4$ | 0.92971 |
| $M_5$ | 0.95331 |
| $M_6$ | 0.97582 |
| $M_7$ | 0.99701 |
| $M_8$ | 1.01664 |
| $M_9$ | 1.03445 |
| $M_{10}$ | 1.05023 |
| $M_{11}$ | 1.06375 |
| $M_{12}$ | 1.07482 |
| $M_{13}$ | 1.08327 |
| $M_{14}$ | 1.08898 |
| $M_{15}$ | 1.09186 |
| $M_{16}$ | 1.09186 |
| $M_{17}$ | 1.08898 |
| $M_{18}$ | 1.08327 |
| $M_{19}$ | 1.07482 |
| $M_{20}$ | 1.06375 |
| $M_{21}$ | 1.05023 |
| $M_{22}$ | 1.03445 |
| $M_{23}$ | 1.01664 |
| $M_{24}$ | 0.99701 |
| $M_{25}$ | 0.97582 |
| $M_{26}$ | 0.95331 |
| $M_{27}$ | 0.92971 |
| $M_{28}$ | 0.90527 |
| $M_{29}$ | 0.88019 |
| $M_{30}$ | 0.85470 |
| $M_{31}$ | 0.82898 |

IMAGE FORMING APPARATUS

FIELD OF THE INVENTION AND RELATED ART

The present invention relates to an image forming apparatus and relates to magnification correction in optical scanning suitable for the image forming apparatus of an electrophotographic type, such as a copying machine or a printer, for example.

Conventionally, in the image forming apparatus of the electrophotographic type, a photosensitive drum surface is electrically charged by a charging device uniformly, and an electrostatic latent image is formed using an exposure device for scanning the photosensitive drum surface with laser light, and then the electrostatic latent image is visualized as a toner image by depositing toner on thereon by a developing device. Then, the toner image is transferred onto a recording material (medium) such as paper by a transfer device and is fixed on the recording material by a fixing device.

In such a constitution, in the exposure device, the photosensitive drum surface is two-dimensionally scanned with the laser light by rotation of a polygonal mirror and rotation of the photosensitive drum. At this time, scanning with the rotation of the polygonal mirror is main scanning, and scanning with the rotation of the photosensitive drum is sub-scanning. Further, in the main scanning with the rotation of the polygonal mirror, an fθ lens is provided on an optical path of the laser light, so that laser scanning characteristics such as a main scanning speed, an optical path length and an incident angle are uniformized.

Japanese Laid-Open Application (JP-A) 2004-338280 has proposed, as a constitution using no fθ lens in pursuit for low cast, a type in which magnification correction is made all by electrical image processing correction. In this constitution, a method in which moire and color misregistration at a region boundary are suppressed by dividing a region with respect to a main scanning direction into regions different depending on sub-scanning position and by subjecting the divided regions to the magnification correction has been proposed.

JP-A 2005-238584 has proposed a method in which an increase of a magnification error in each of divided regions due to accumulation at a scanning end portion in main scanning. In this constitution, a method in which correction is made using a linear expression so that partial magnification in each of divided sections conforms to full-width magnification in the main scanning has been proposed.

Here, in the conventional optical constitution using the fθ lens, the magnification correction in one scanning is made with a value of ±3%, but in an optical constitution using no fθ lens, a magnification fluctuation amount increases, so that image distortion is liable to occur. With reference to FIG. 14, magnification calculation in the optical constitution using no fθ lens will be described. In a state in which rotation of a polygonal mirror 1501 is stable at a predetermined speed, an angular speed of rotation becomes constant. At this time, an illuminating angle to a photosensitive drum 1502 is θ, a distance the polygonal mirror 1501 and the photosensitive drum 1502 is R, a distance on a surface of the photosensitive drum 1502 is L, and a time is t. Formulas 1 to 4 for deriving a scanning speed v(θ) are represented as follows.

$$\Delta L = R \times \tan(\theta + \Delta\theta) - R \times \tan\theta \qquad \text{formula 1}$$

$$\Delta L/\Delta\theta = R \times (\tan(\theta + \Delta\theta) - \tan\theta)/\Delta\theta \qquad \text{formula 2}$$

$$\Delta\theta \to 0$$

$$\Delta L/\Delta\theta = R/\cos^2\theta \qquad \text{formula 3}$$

Here, an angular speed of rotation of the polygonal mirror in represented as follows using $\Delta\theta/\Delta t = \omega$ $$v(\theta) = \Delta L/\Delta t = \Delta L/\Delta\theta \times \Delta\theta/\Delta t = R\omega/\cos^2\theta \qquad \text{formula 4}$$

The scanning speed v(θ) is proportional to pixel magnification, and therefore, a graphic plot thereof in which the abscissa is the illuminating angle θ and the ordinate is the pixel magnification is shown in FIG. 15. In FIG. 15, normalization is made under a condition that the pixel magnification at $v(\theta) = R\omega$ when $\theta = 0°$ is 1.

Here, in order to decrease a physical size of a scanning optical system, it is required that the distance R is decreased to the extent possible while maintaining the distance L, and correspondingly, a maximum of the pixel magnification also increases.

In the case where the partial magnification in each of divided sections with respect to the main scanning direction is changed, in the conventional method, certain different pixel magnification values are set in regions, respectively, or the partial magnification is corrected with pixel magnification which has been subjected to linear interpolation (JP-A 2005-238584). At this time, for example, in FIG. 16 in which the scanning region is divided into 32 regions, in the first half of the regions, as shown in a scanning end portion 1701, a magnification difference 1702 becomes large at a region boundary. Further, in the latter half of the regions, as shown in a scanning end portion 1703, a magnification change rate becomes discontinuous (1704). For that reason, a pseudo contour is liable to generate on an output image.

SUMMARY OF THE INVENTION

A principal object of the present invention is to provide an image forming apparatus capable of forming a high-quality image by equalizing magnification differential values to each other at boundaries of divided regions with respect to a scanning direction of a laser beam even in a constitution of a simple fθ lens or in a constitution with no fθ lens.

According to an aspect of the present invention, there is provided an image forming apparatus comprising: a photosensitive member; a light source configured to emit a light beam; a deflecting unit configured to deflect the light beam so that the photosensitive member is scanned with the light beam emitted from the light source; a storing unit configured to store magnification correction data set for each of a plurality of different scanning regions with respect to a scanning direction of the light beam; a correcting unit configured to correct, on the basis of the magnification correction data stored in the storing unit, image data for each of scanning positions included in a region corresponding to the magnification correction data and configured to output a driving signal on the basis of corrected image data; and a light source driving portion configured to drive the light source with the driving signal, wherein the magnification correction data is determined using a quadratic function of a variable representing the scanning position with respect to the scanning direction, wherein a result of an operation performed by the quadratic function represents a correction amount for correcting a magnification of a pixel formed at the scanning position corresponding to the variable, and wherein coefficients of two quadratic functions corresponding to adjacent two regions included in the scanning regions are set so that a differential value calculated at the variable corresponding to a boundary of the two regions by a differential of the quadratic function for one region and a differential value calculated at the variable corresponding to the boundary of the two regions by a differential of the quadratic function for the other region are equal to each other.

Further features of the present invention will become apparent from the following description of exemplary embodiments with reference to the attached drawings.

BRIEF DESCRIPTION OF THE DRAWINGS

Parts (a) and (b) of FIG. 1 are schematic views each showing an entirety of an image forming apparatus in which an optical scanning device according to an embodiment of the present invention.

FIG. 5 is a look-up table (LUT) of the PWM according to the embodiment of the present invention.

FIG. 8 is a table showing measured values of a sensor passing time according to the embodiment of the present invention.

FIG. 9 is a table showing an inter-sensor time according to the embodiment of the present invention.

FIG. 10 is a table showing partial magnification according to the embodiment of the present invention.

DESCRIPTION OF THE DRAWINGS

An embodiment for carrying out the present invention will be described below with reference to the drawings.

First Embodiment (Image Forming Apparatus)

Figure 1:
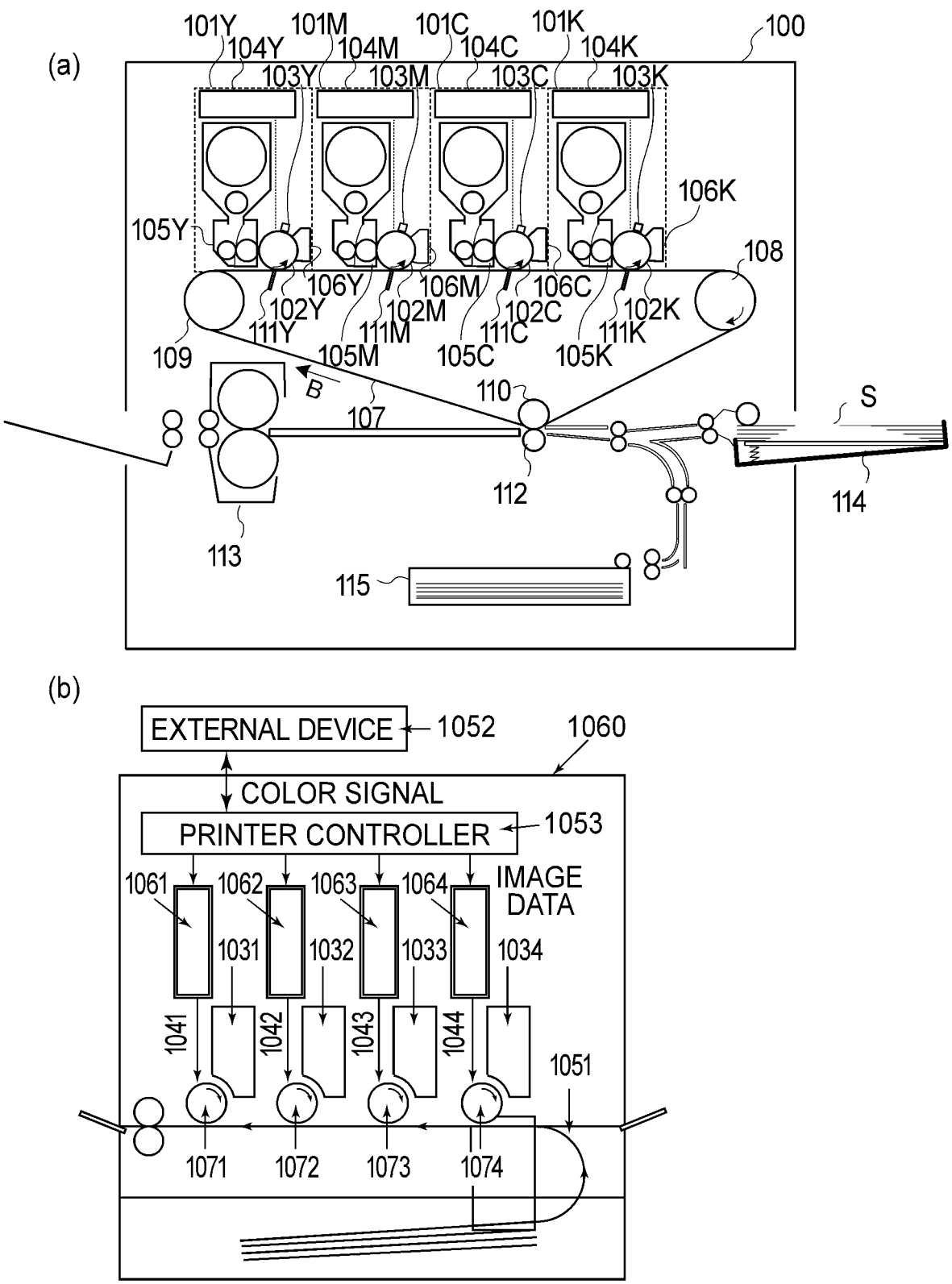

Part (a) of FIG. 1 shows a structure of a main assembly of a digital copying machine which is an example of an image forming apparatus according to an embodiment of the present invention. Specifically, part (a) of FIG. 1 is a schematic sectional view of a digital full-color printer (color image forming apparatus) for forming an image with toners of a plurality of colors. An image forming apparatus 100 includes four image forming portions 101Y, 101M, 101C and 101K for forming images color by color. Here, Y, M, C and K represent yellow, magenta, cyan and black, respectively. The image forming portions 101Y, 101M, 101C and 101K carry out image formation with toners of yellow, magenta, cyan and black, respectively.

The image forming portions 101Y, 101M, 101C and 101K include rotatable photosensitive drums 102Y, 102M, 101C and 101K, respectively.

At peripheries of the photosensitive drums 102Y, 102M, 102C and 102K, charging devices (chargers) 103Y, 103M, 103C and 103K, optical scanning devices 104Y, 104M, 104C and 104K, developing devices 105Y, 105M, 105C and 105K are provided, respectively.

Under the photosensitive drums 102Y, 102M, 102C and 102K, an endless belt-shaped intermediary transfer belt (intermediary transfer member) 107 is provided. The intermediary transfer belt 107 is stretched by a driving roller 108 and follower rollers 109 and 110 and is rotated in an arrow B direction in the figure during image formation. Further, at positions opposing the photosensitive drums 102Y, 102M, 102C and 102K through the intermediary transfer belt 107, primary transfer devices 111Y, 111M, 111C and 111K are provided, respectively.

The image forming apparatus 100 in this embodiment further includes a fixing device 113 for fixing toner images on the intermediary transfer belt 107. Here, an image forming process from a charging step to a developing step of the image forming apparatus 100 having such a constitution will be described. The image forming processes in the respective image forming portions are the same, and therefore, description will be made using the image forming portion 101Y as an example, and the image forming processes in the image forming portions 101M, 101C and 101K will be omitted from description.

First, by the charging device of the image forming portion 101Y, the photosensitive drum 102Y to be rotationally driven is electrically charged. A drum surface (surface-to-be-scanned, predetermined surface) of the charged photosensitive drum 102Y (image bearing member) is subjected to scanning exposure with a light beam from a laser light source in the optical scanning device 104Y described specifically later, with respect to a scanning direction (main scanning direction) by rotation of a polygonal mirror. As a result, an electrostatic latent image is formed on the rotating photosensitive drum (photosensitive magnification). Thereafter, the electrostatic latent image is developed as a toner image of yellow by the developing device 105Y.

In the following, an image forming process of a transfer step and later will be described using the respective image forming portions as an example. The primary transfer devices 111Y, 111M, 111C and 111K apply transfer biases to the transfer belt. As a result, the toner images of yellow, magenta, cyan and black formed on the photosensitive drums 102Y, 102M, 102C and 102K are transferred onto the intermediary transfer belt 107. As a result, on the intermediary transfer belt 107, the respective color toner images are superposed.

Thus, the toner images of the four colors are superposed on the intermediary transfer belt 107. Then, the four color toner images transferred on the intermediary transfer belt 107 are transferred again (secondary-transferred) by a secondary transfer device 112 onto a recording material (medium) S fed to a secondary transfer portion from a manual-feeding cassette 114 or a feeding cassette 115. Then, the toner image on the recording material S is heated and fixed by the fixing device 113 and is discharged to a discharge portion, so that a full-color image is obtained on the recording medium (transfer receiving material, recording material, recording paper).

Further, the image forming apparatus may also be constituted as shown in part (b) of FIG. 1. In part (b) of FIG. 1, into a color image forming apparatus 1060, color signals of R (red), G (green) and B (blue) are inputted from an external device 1052 such as a personal computer. These color regions which are code data are converted into image signals (dot data) of C (cyan), M (magenta), Y (yellow) and B (back), respectively, by a printer controller 1053 in the apparatus. These image data are inputted into optical scanning devices 1061, 1062, 1063 and 1064, respectively.

Then, from these optical scanning devices (described later specifically), light beams 1041, 1042, 1043 and 1044 modulated depending on the image data are emitted. Photosensitive surfaces of photosensitive drums 1071, 1072, 1073 and 1074 are scanned in a main scanning direction with the laser beams, respectively. In the color image forming apparatus in this embodiment, four optical scanning devices 1061, 1062, 1063 and 1064 are arranged in parallel to each other and correspond to C (cyan), M (magenta), Y (yellow) and B (black), respectively.

As the external device 1052, for example, a color image reading device provided with a CCD sensor may also be used. In this case, a color digital copying machine is constituted by this color image reading device and the color image forming apparatus 1060.

(Optical Scanning Device)

Figure 2:
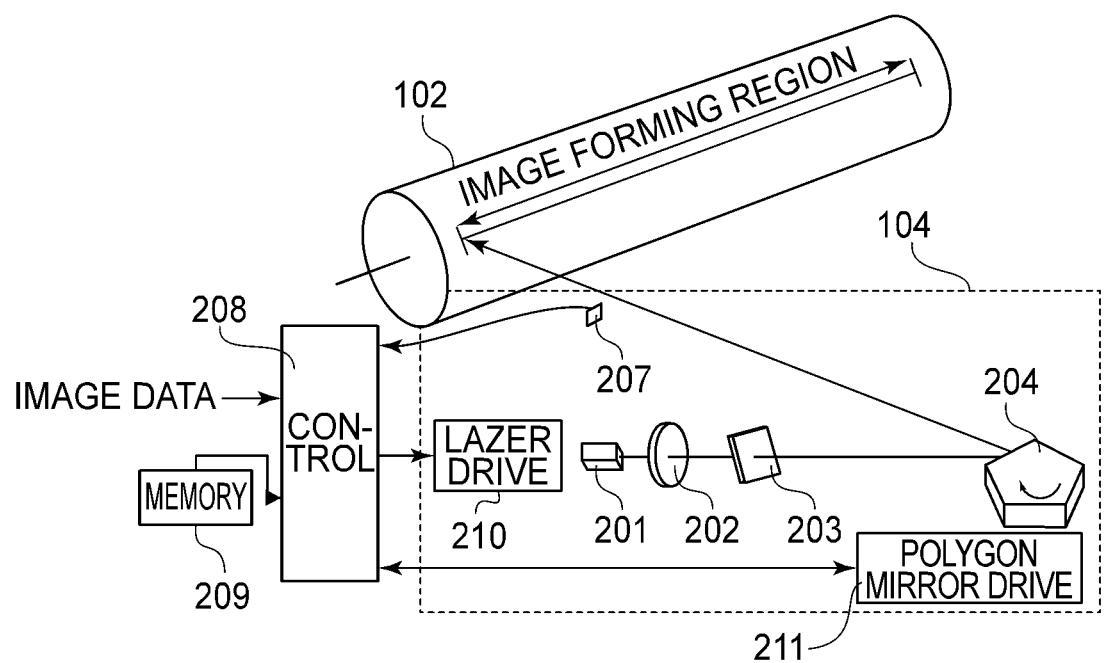
FIG. 2 is a schematic view showing a constitution of the optical scanning device according to the embodiment of the present invention and a photosensitive drum.

FIG. 2 shows, together with a photosensitive drum 102, the optical scanning device 104 and a controller of the optical scanning device 104. Incidentally, constitutions of the photosensitive drums and optical scanning devices for the respective colors are the same, and therefore suffixes Y, M, C and K for representing the respective colors will be omitted in the following description.

The optical scanning device 104 includes, as a light source, a multi-beam laser light source 201 for generating a plurality of laser lights (laser beams). Further, the optical scanning device 104 includes a collimator lens 202 for rectifying the laser light to parallel light, a cylindrical lens 203 for focusing the laser light passing through the collimator lens 202 in a sub-scan direction (direction corresponding to a rotational direction of the photosensitive magnification) and a polygonal mirror (rotatable polygonal mirror) 204. Incidentally, the laser light source 201 is similarly operated also in the case where a multi-beam light source in which a plurality of beams are arranged or a single light source is used.

The polygonal minor 204 is constituted by a motor portion for performing a rotational operation and a reflecting minor mounted on a motor shaft. In this embodiment, a minor having 5 reflecting surface but a different number of reflecting surfaces may also be used. The optical scanning device 104 further includes a beam detector 207 (hereinafter, referred to as a BD) 207 which is a signal generating unit for outputting a horizontal synchronizing signal (hereinafter, referred to as a BD signal) in response to detection of the laser light deflected by the polygonal minor 204.

The surface of the photosensitive drum 102 is scanning-exposed to light with the laser light emitted from the optical scanning device 104. As regards the scanning direction (main scanning direction), positioning between the optical scanning device 104 and the photosensitive drum 102 is made so that the scanning is carried out in parallel to a rotational axis of the photosensitive drum 102. Every scanning of the photosensitive drum 102 with the laser beam reflected by one of the mirror surfaces of the polygonal mirror 204, scanning lines corresponding to the number of laser elements of a multi-beam laser are simultaneously formed.

(Controller 208 of Optical Scanning Device)

A controller 208 of the optical scanning device 104 will be described with reference to FIG. 2. The controller 208 also functions as a correcting unit in which image data for each of scanning positions included in a region corresponding to associated one of magnification correction data is corrected on the basis of the associated one of magnification correction data (coefficients $a_n$, $b_n$, $c_n$ calculated as described later specifically) and then a driving signal is outputted on the basis of the corrected image data. Incidentally, the magnification correction data set for a plurality of different scanning regions, respectively, with respect to the light beam scanning direction are stored in a memory (for example, a memory 209 shown in FIG. 2) as a storing unit.

In this embodiment, the magnification correction data defines a quadratic function that the scanning position with respect to the scanning direction is a variable, and a result of an operation performed by the variable and the quadratic function corresponds to a correction amount for correcting a magnification of a pixel formed at the scanning position corresponding to the variable. Further, with respect to adjacent two regions included in a plurality of scanning regions, a differential value calculated by a differential form of the quadratic function corresponding to one region and a variable corresponding to a boundary of the two regions is set in the following manner.

That is, the differential value is set so as to be equal to a differential value calculated by a differential form of the quadratic function corresponding to the other region and the variable corresponding to the boundary of the two regions. Thus, two quadratic function coefficients corresponding to the two regions, respectively, are set.

Into the controller 208, image data is inputted from an image controller (a printer controller 1053 shown in part (b) of FIG. 1) for generating image data. Further, the controller 208 is connected with the BD sensor 207, the memory 209, a laser driving portion 210 as a light source driving portion described later specifically, and a polygonal mirror driving portion 211.

The controller 208 detects a writing position of a main scanning line on the basis of a BD signal outputted from the BD sensor 207 and detects a rotational speed of the polygonal mirror 204 by counting a time interval of the BD signal. Then, the controller 208 provides an acceleration/deceleration instruction to the polygonal mirror driving portion 211 so that a speed of the polygonal minor 204 is a predetermined speed. The polygonal minor driving portion 211 supplies a driving current to a motor portion of the polygonal mirror 204 correspondingly to an inputted acceleration/deceleration signal, and thus drives a motor of the polygonal mirror 204.

(Image Processing Performed in Controller 208)

Figure 3:
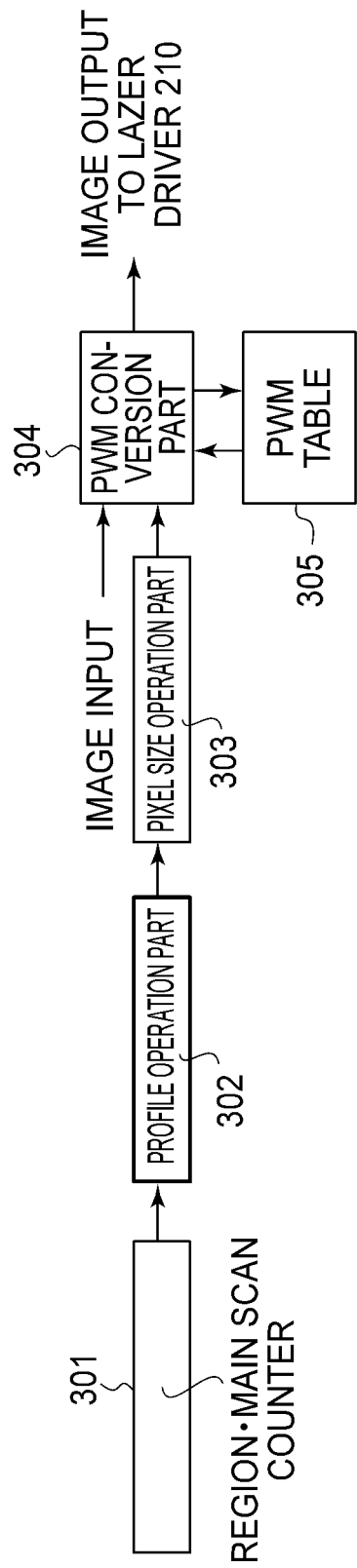
FIG. 3 is a schematic view showing a constitution of an image processing portion according to the embodiment of the present invention.
Figure 7:
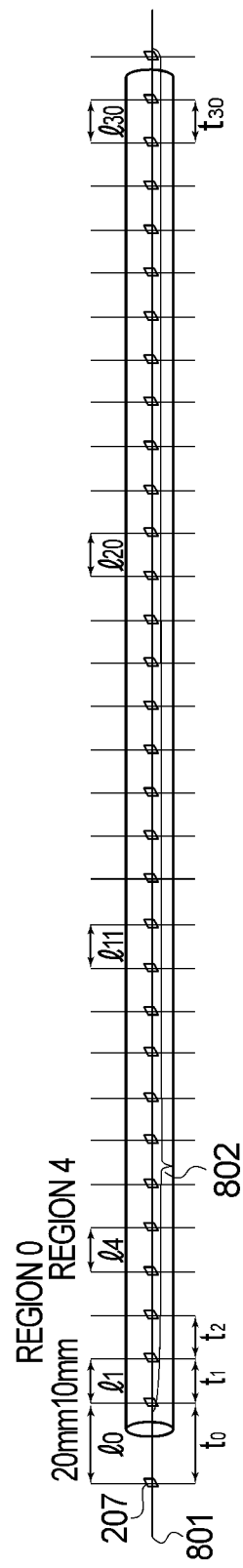
FIG. 7 is a schematic view showing region magnification measurement according to the embodiment of the present invention.

FIG. 3 shows a block diagram of image processing performed in the controller 208. This embodiment is based on the premise that the main scanning line is divided into a plurality of segments (32 regions from region 0 to region 31) on a pixel unit basis. In a region/pixel counter 301, pixel counting with respect to the main scanning direction is carried out, and in each of the 32 regions, a region number is outputted. Further, a pixel count value in each of the regions is also outputted. A length of each of the 32 regions is designated by the number of pixels individually for the 32 regions in advance. Here, as shown in FIG. 7, lengths of the 32 regions are represented by $l_0, l_1, l_2, \ldots l_{30}$ and $l_{31}$, respectively.

When the BD signal is inputted, a pixel counter and a region counter are cleared. The pixel counter counts the pixel from 0 to $l_n$. Thereafter, the pixel counter is cleared and then counts up the pixel from 0 to $l_{n+1}$. n is 0 to 31 to the maximum. By repeating this operation, the region number and the pixel count in the region are outputted to a profile operation part 302.

The profile operation part 302 calculates a pixel magnification by a profile function corresponding to the region number and outputs the pixel magnification to a pixel size operation part 303. The profile operation part 302 which is a characteristic part of this embodiment will be described later in detail.

The pixel size operation part 303 outputs, on the basis of an output of the profile operation part 302, data indicating the number of bits of bit data for forming one pixel, to a PWM conversion part 304.

Figure 4:
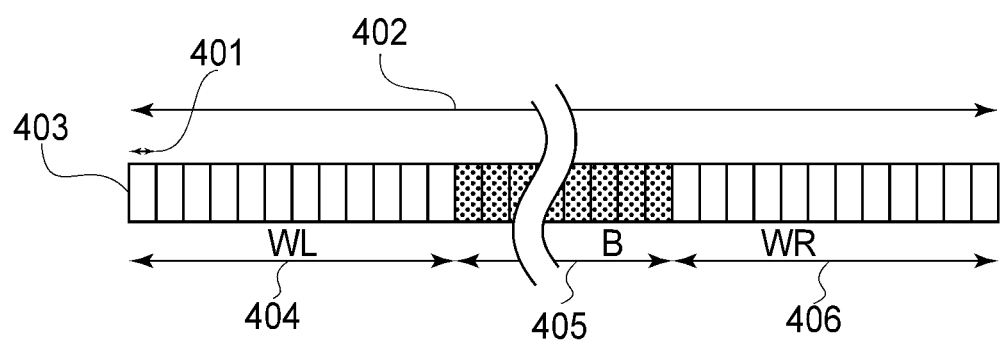
FIG. 4 is an illustration of PWM according to the embodiment of the present invention.

In the following, one pixel and the number of bits of the bit data will be described with reference to FIG. 4. A bit data 401 is a minimum unit data outputted at a high-speed clock in the later-stage PWM conversion part 304. A size of each of pixels is defined as an integral multiple of the bit data 401 which is the minimum data clock-outputted as a PWM signal. In FIG. 4, a pixel (cyclic) period 402 is a (cyclic) period determined by the profile operation part 302, and is different depending on a scanning position.

When the pixel magnification is 1 as a reference belt, a reference size at each of pixels is determined depending on setting of a resolution per inch. For example, at 600 DPI, one pixel is formed by 208 bit data. For that reason, when magnification designation from the above-described profile operation part 302 is 0.81609, one pixel is formed by 208×0.81609+A≈169 bit data. Here, α is the decimal (fractional) part during calculation of the above-described pixel size, and eliminates an error of an entire size by accumulation of the decimal part of the pixel size which is not outputted to the PWM conversion part 304.

The PWM conversion part 304 outputs a PWM signal (pulse width modulation signal) as a laser driving signal to the laser driving portion 210 from a pixel density input and a pixel size input, corresponding to the pixel, inputted from the pixel size operation part 303 (FIG. 3). As a result, the laser driving portion 210 drives the multi-beam laser light source 201 with a driving signal corresponding to the size of each of pixels calculated by the pixel size operation part 303 and an image data value (density) corresponding to the associated one of pixels.

Here, when data relating to the PWM signal for each of densities corresponding to the associated one of pixels depending on the size of the associated one of pixels is stored a table, the PWM signal can be quickly outputted, and therefore, the use of such a table is preferred. In this embodiment, a PWM table (FIG. 5) 305 is used as a LUT (look-up table), and a PWM pattern for outputting the PWM signal is formed. The PWM pattern is subjected to parallel-serial conversion at a high-speed clock, and is outputted as the laser driving signal (PWM signal).

The PWM table 305 (Figure) is the LUT for generating the PWM signal from a pixel density and a pixel size, and for example, a LUT including 4-bit data at densities 0 to 15 in the case of a reference pixel size of 230. FIG. 5 shows tables (bit patterns) of bit data of WL (White Left), B (Black), WR (White Right) at densities 0 to 15 in each of the cases pixel sizes 200, 201, 202, ..., 230, ... 259 and 260.

WL, B and WR are bit number designation from a starting point of a PWM waveform 403 shown in FIG. 4, and represent a left-side white length WL (White Left) 404, a central black length B (Black) 405 and a right-side white length WR (White Right) 406, respectively.

As shown in FIG. 3, the laser driving signal outputted from the PWM conversion part 304 is sent to the laser driving portion 210 of the optical scanning device 104, so that the laser light source 201 is driven and thus image formation is carried out.

In the following, an operation of the profile operation part 302 according to this embodiment will be described specifically. A profile function in this embodiment is defined by a quadratic function $Pr_n$ as a curve function which can be individually set in each of regions (segments). Further, quadratic function coefficients $a_n$, $b_n$ and $c_n$ in each of regions (segments) are set in advance. That is, the quadratic function $Pr_n$ is the following quadratic function.

$Pr_n(x) = a_n x^2 + b_n x + c_n$ (where n is an integer of 0 to 31 and shows a region (segment))

The quadratic function coefficients $a_n$, $b_n$ and $c_n$ in each of regions (segments) are set (specified) individually in each region. That is, as described later, the quadratic function coefficients are calculated on the basis of partial magnifications $M_0, M_1, M_2, \ldots M_{30}$ and $M_{31}$ which are measured in advance.

<Measurement of Partial Magnification in Each Region (Each Segment)>

Figure 6:
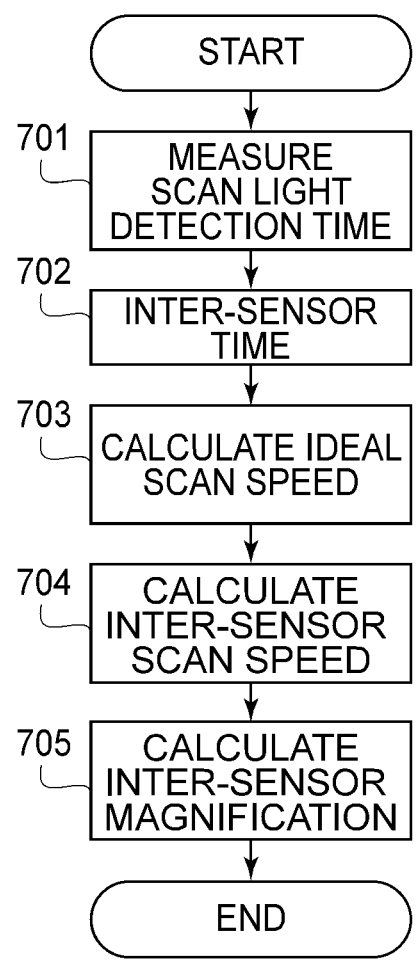
FIG. 6 is a flowchart of magnification measurement according to the embodiment of the present invention.

FIG. 6 shows a flowchart of measurement of the partial magnification in each of regions (segments). In a step of scanning light detection time measurement 701, a scanning time between respective sensors 802 is measured during assembling of the optical scanning device 104 shown in FIG. 7 by using a BD sensor 207 provided on an optical scanning line 801 and the sensors 802 provided on the drum with a 10 mm-interval.

Here, lengths of the respective regions are designed so that $l_0 = 20$ mm and $l_1 = l_2 = \ldots = l_{30} = l_{31} = 10$ mm. FIG. 8 shows measured values of a passing time of scanning laser light through each of sensors 802 when a passing time of scanning laser light through the BD sensor 207 is 0. Symbols sns 0 to 31 represents the sensors 802 (FIG. 7) subsequent to the BD sensor 207.

In a step of an inter-sensor time 702, scanning times of the respective regions (segments) are taken as $t_0, t_1, t_2 \ldots t_{30}$ and $t_{31}$, and from the measured values in the step of scanning light detection time measured 701, a time difference is acquired. A scanning time of each of regions (segments) is shown in FIG. 9.

Next, in a step of an ideal scanning speed calculating portion 703, a reference scanning speed (the drum surface is scanned at a certain speed) $v_{ref}$ as an ideal scanning speed is calculated in the following manner from a distance from the BD sensor 207 (sns 0) to a mostdownstream sensor (sns 30) of the sensors 802 and the scanning time.

$$v_{ref} = (\text{distance from } sns \text{ 0 to } sns \text{ 30})/ \quad \text{formula 5}$$
$$(\text{scanning time from } sns \text{ 0 to } sns \text{ 30}) =$$
$$300 \text{ mm}/(405.419 - 20.919) \approx 780233.345 \text{ (mm/s)}$$

Next, in a step of inter-sensor scanning speed calculation 704, the scanning speeds of the respective regions (segments) are calculated in the following manner from the scanning times $t_0, t_1, t_2, \ldots t_{30}$ and $t_{31}$ of the regions and the region lengths $l_0, l_1, l_2 \ldots l_{30}$ and $l_{31}$ of the regions.

$$v_n = l_n/t_n \ (n: 0\text{-}31) \qquad \text{formula 6}$$

Next, in a step of inter-sensor magnification calculation 705, the partial magnifications in the respective regions (segment) are calculated. The magnification of image writing to the drum surface is proportional to the scanning speed $v_n$, and therefore, when an ideal scanning speed is 1, the magnification of image writing to the drum surface is $v_n/v_{ref}$. Here, in order to make the magnification of image writing to the drum surface 1, an original image is reduced. For that reason, in order to correct the image writing magnification, image magnification of image processing in each of regions (segments) is taken as $v_{ref}/v_n$ which is the inverse of $v_n/v_{ref}$. That is. when the formula 6 is substituted in the image magnification, the image magnification $M_n = v_{ref} \times t_n/l_n$. FIG. 10 shows partial magnifications $M_0, M_1, M_2, \ldots M_{30}$ and $M_{31}$ calculated in the respective regions.

Thus, in this embodiment, a main scanning line is divided into a plurality of segments (region 0 to region 31) on a pixel unit basis, and data of the partial magnifications in the respective segments are taken as first magnification data. Further, magnification data which are the inverse of the partial magnification in the respective segments are taken as second magnification data ($M_0$ to $M_{31}$).

Further, as described below, on the basis of the second magnification data, a curve function relating to the position and the magnification with respect to the main scanning direction is determined so that an upstream-side magnification differential value (magnification gradient) and a downstream-side magnification differential value (magnification gradient) with respect to the main scanning direction are equal to each other at a boundary between segments. Then, from pixel magnification at each pixel position in each segment, a pixel size in each segment is calculated. Such processing is carried out by the controller 208.

In the following, on the basis of the second magnification data, acquisition of the pixel magnification at each pixel position in each segment will be described using the curve function relating to the position and the magnification with respect to the main scanning direction. In this embodiment, the pixel magnification at each pixel position in each segment is acquired using, as a curve function depending on an associated one of segments, a quadratic function depending on the associated one segment. The quadratic function depending on the associated one segment is represented by $Pr_n(x) = a_n x^2 + b_n x + c_n$ (n: 0 to 31), and in each of the segments (n: 0 to 31), the coefficients $a_n$, $b_n$ and $c_n$ are calculated.

<Region 0>

Figure 11:
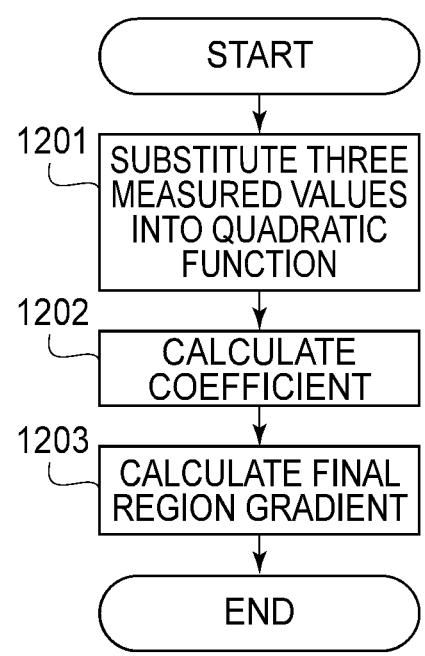
FIG. 11 is a flowchart of magnification calculation in region 0 according to the embodiment of the present invention.
Figure 12:
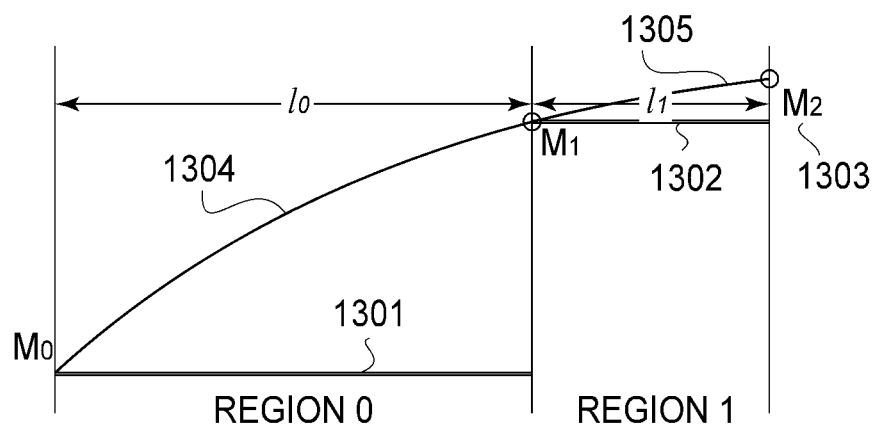
FIG. 12 is an illustration relating to magnification of region 0 and region 1 according to the embodiment of the present invention.

In a flowchart of FIG. 11, a flow of calculating the quadratic function coefficients $a_n$, $b_n$ and $c_n$ in region (segment) 0 will be described. FIG. 12 is an enlarged view of region 0 (1301), region 1 (1302) and region 2 (1303) which relate to the second magnification data. The magnifications $M_0, M_1$ and $M_2$ are magnifications in the region 0 (1301), the region 1 (1302) and the region 2 (1303), respectively, and from FIG. 10, $M_0=0.81609$, $M_1=0.85470$ and $M_2=0.88019$. The region 0 is a region (mostupstream region with respect to the main scanning direction) from the BD sensor to an end of the drum and is a first region of all the regions, and therefore, the magnification differential value (magnification gradient) at a starting position of a quadratic function (partial magnification curve) 1304 cannot be defined.

Therefore, only for the region 0, the quadratic function 1304 is calculated from the three magnification data $M_0$, $M_1$ and $M_2$. Here, the quadratic function 1304 is represented by the following formula.

$$Pr_0(x) = a_0 x^2 + b_0 x + c_0 \qquad \text{formula 7}$$

Then, in a step of substitution of three measured into quadratic function 1202, when the three data $M_0$, $M_1$ and $M_2$ into the formula 7, the following formulas are obtained $$Pr_0(0) = a_0 0^2 + b_0 0 + c_0 = M_0 \qquad \text{formula 8}$$

$$Pr_0(l_0) = a_0 l_0^2 + b_0 l_0 + c_0 = M_1 \qquad \text{formula 9}$$

$$Pr_0(l_0+l_1) = a_0(l_0+l_1)^2 + b_0(l_0+l_1) + c_0 = M_2 \qquad \text{formula 10}$$

In a step of coefficient calculation 1202, simultaneous ternary quadratic equations of the formulas 8, 9 and 10 are solved. From the formula 8, $c_0 = M_0 = 0.81609$. Further, from the formula 9, $a_0 l_0^2 + b_0 l_0 = M_1 - M_0$, and therefore, when this is solved for the coefficient $a_0$, the following formula is obtained.

$$a_0 = \frac{(M_1 - M_0) - (b_0 \cdot l_0)}{l_0^2} \qquad \text{formula 11}$$

From the formula 10, the following equations hold.

$$a_0 \cdot (l_0+l_1)^2 + b_0 \cdot (l_0+l_1) = M_2 - M_0 \qquad \text{formula 12}$$

$$a_0 = \frac{(M_2 - M_0) - b_0 \cdot (l_0+l_1)}{(l_0+l_1)^2}$$

From the formulas 11 and 12, the following equation holds.

$$a_0 = \frac{(M_1 - M_0) - (b_0 \cdot l_0)}{l_0^2} = \frac{(M_2 - M_0) - b_0 \cdot (l_0+l_1)}{(l_0+l_1)^2}$$

When terms of $b_0$ are transposed to the left side and other terms are arranged on the right side, the following equation is obtained.

$$\frac{-(b_0 \cdot l_0)}{l_0^2} + \frac{b_0 \cdot (l_0+l_1)}{(l_0+l_1)^2} = \frac{(M_2 - M_0)}{(l_0+l_1)^2} - \frac{(M_1 - M_0)}{l_0^2}$$

When the left side is summarized for $b_0$, the following equation is obtained.

$$b_0 \cdot \left(-\frac{1}{l_0} + \frac{1}{(l_0+l_1)}\right) = \left(\frac{-(l_0+l_1)+l_0}{l_0 \cdot (l_0+l_1)}\right) = \frac{(M_2-M_0)}{(l_0+l_1)^2} - \frac{(M_1-M_0)}{l_0^2}$$

Here, when $b_0$ is acquired, $b_0$ is represented by the following equation.

$$b_0 = \left(\frac{(M_2-M_0)}{(l_0+l_1)^2} - \frac{(M_1-M_0)}{l_0^2}\right) \cdot \frac{l_0 \cdot (l_0+l_1)}{-l_1} =$$

$$\left(\frac{l_0^2 \cdot (M_2-M_0) - (l_0+l_1)^2 \cdot (M_1-M_0)}{l_0^2 \cdot (l_0+l_1)^2}\right) \cdot \frac{l_0 \cdot (l_0+l_1)}{-l_1} =$$

$$\frac{l_0^2 \cdot (M_2-M_0) - (l_0+l_1)^2 \cdot (M_1-M_0)}{-l_0 \cdot l_1 \cdot (l_0+l_1)}$$

When $M_0$, $M_1$, $M_2$, $l_0$ and $l_1$ are substituted in the above formula, $b_0$ is acquired as follows.

$$b_0 = \frac{l_0^2 \cdot (M_2 - M_0) - (l_0 + l_1)^2 \cdot (M_1 - M_0)}{-l_0 \cdot l_1 \cdot (l_0 + l_1)} =$$

$$\frac{400 \cdot (0.88019 - 0.81609) - 900 \cdot (0.85470 - 0.81609)}{-200 \cdot 30} = 0.001518167$$

By substituting $b_0$, $M_0$, $M_1$ and $l_0$ in the formula 11, $a_0$ is acquired as follows.

$$a_0 = \frac{(M_1 - M_0) - (b_0 \cdot l_0)}{l_0^2} =$$

$$\frac{(0.85470 - 0.81609) - (0.001518167 \cdot 20)}{20^2} = 0.000020617$$

Next, in a step of final region gradient calculation 1203, a gradient of a magnification change at a boundary between the region 0 and the region 1 is acquired. The gradient is a differential value, and therefore, from the formula 7, the following equation holds.

$$Pr_0'(x) = 2 \cdot a_0 \cdot x + b_0$$

When $x = l_0 = 20$, and $a_0$ and $b_0$ are substituted in this equation, the following formula is obtained.

$$Pr_0'(l_0) = 2 \cdot a_0 \cdot l_0 + b_0 = 2 \cdot 0.000020617 \cdot 20 + 0.001518167 = 0.02342847 \quad \text{formula 13}$$

This formula 13 is used in coefficient calculation in a subsequent region.

<Region 1>

Figure 13:
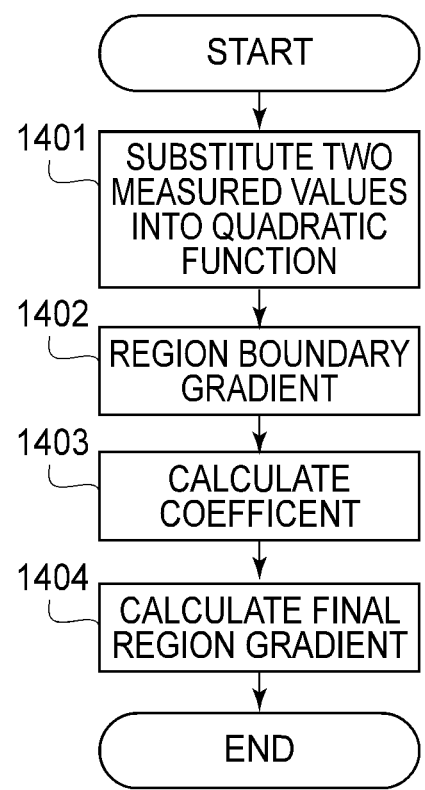
FIG. 13 is a flowchart of magnification calculation in region 1 and later according to the embodiment of the present invention.
Figure 14:
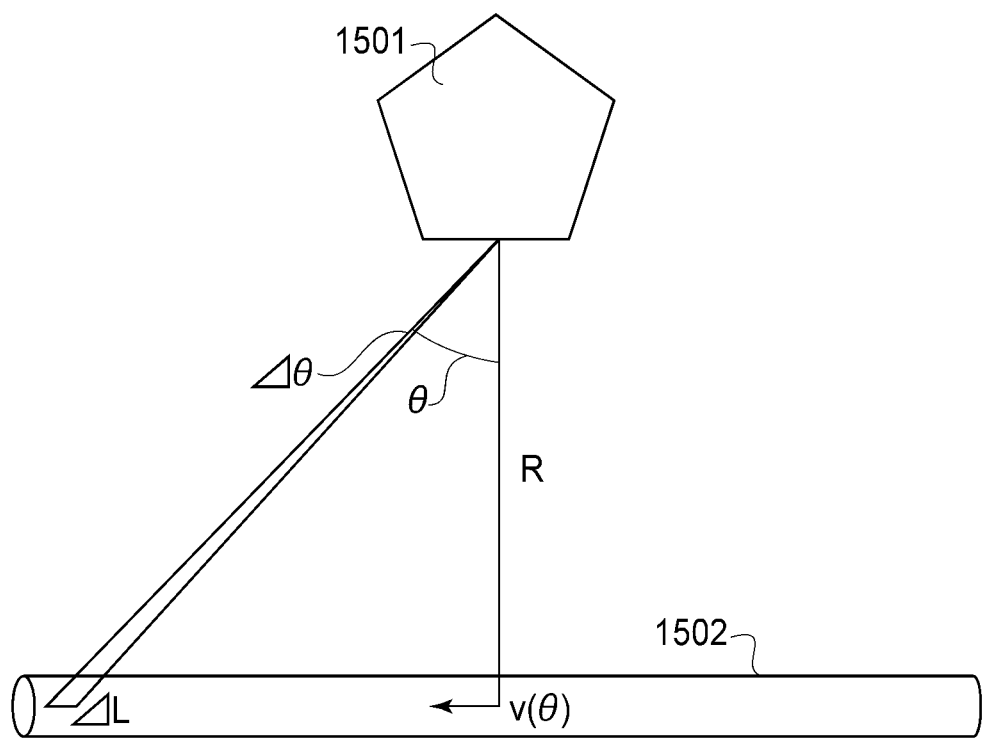
FIG. 14 is a schematic view showing an optical constitution with no fθ lens.
Figure 15:
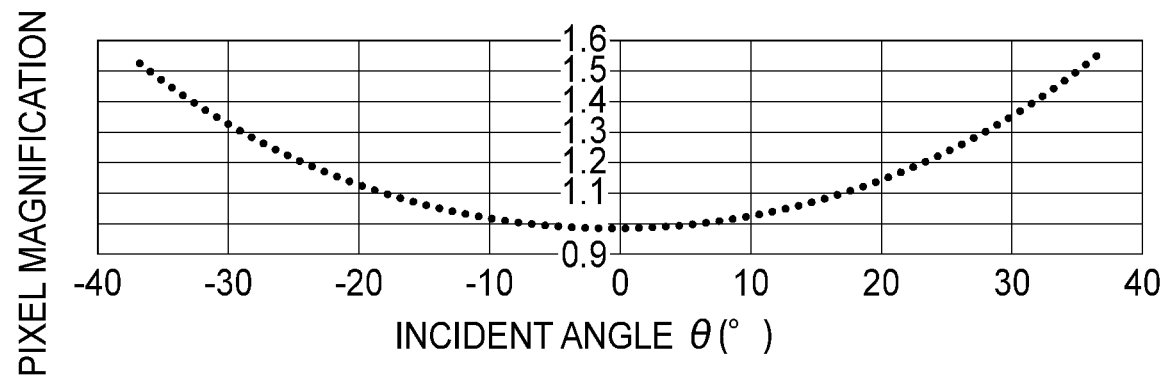
FIG. 15 is a graph relating to magnification in the optical constitution with no fθ lens.
Figure 16:
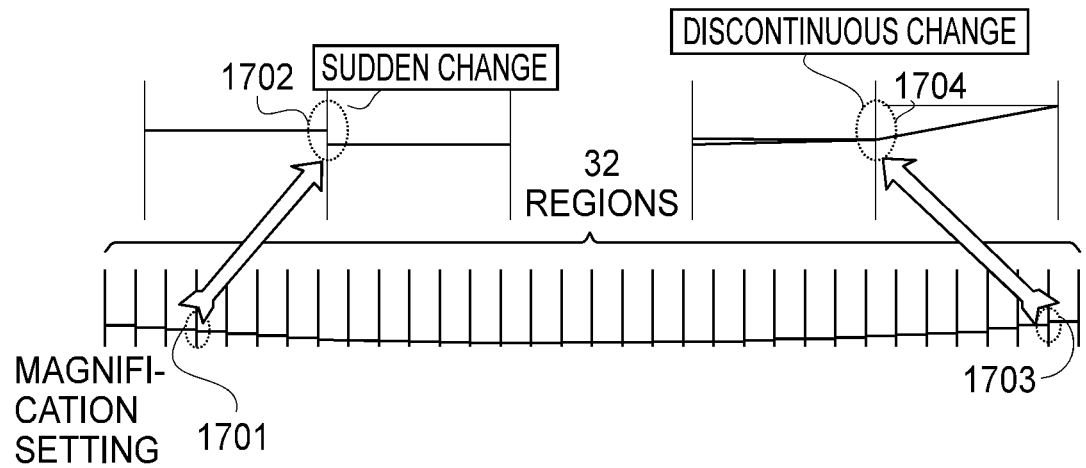
FIG. 16 is a schematic view showing partial magnification of main scanning portions in a conventional example.

Next, calculation of magnification quadratic function coefficients $a_1$, $b_1$ and $c_1$ in the region (segment) 1 adjacent to the region 0 on the downstream side with respect to the main scanning direction will be described using a flowchart of FIG. 13. This calculation is made based on that the two data $M_1$ and $M_2$ in the second magnification data are equal to a magnification differential value (magnification gradient) between the region 1 and the preceding region (region 0). Here, a magnification quadratic function 1305 is represented by the following formula.

$$Pr_1(x) = a_1 x^2 + b_1 x + c_1 \quad \text{formula 14}$$

In a step of substitution of two measured values into quadratic function 1401, when the two data $M_1$ and $M_2$ into the formula 14, the following formulas are obtained.

$$Pr_1(0) = c_1 = M_2 \quad \text{formula 15}$$

$$Pr_1(l_1) = a_1 l_1^2 + b_1 l_1 + c_1 = M_2 \quad \text{formula 16}$$

In a step of region boundary gradient 1402, when a final magnification differential value (upstream-side magnification gradient at the boundary between the region 0 and the region 1 with respect to the main scanning direction) in the preceding region and a first magnification differential value (downstream-side magnification gradient at the boundary between the region 0 and the region 1 with respect to the main scanning direction) in a current region are made equal to each other, the following formula is satisfied.

$$Pr_0'(l_0) = Pr_2'(0) \rightarrow 2 \cdot a_0 \cdot l_0 + b_0 = 2 \cdot a_1 \cdot 0 + b_1 \quad \text{formula 17}$$

In a step of coefficient calculation 1403, simultaneous ternary quadratic functions of the formulas 14, 15 and 16 are solved.

From the formula 15, $c_1 = 0.85470$.

From the formula 16, similarly as in the case of the above-described region 0, when this formula is solved for $a_1$, $a_1$ is represented by the following formula 18.

$$a_1 = \frac{(M_2 - M_1) - (b_1 \cdot l_1)}{l_1^2} \quad \text{formula 18}$$

From the formula 17, the following equation holds.

$$2a_0 l_0 + b_0 = b_1$$

When $a_0$, $l_0$ and $b_0$ are substituted in this equation, $b_1$ is acquired as follows.

$$b_1 = 2 \cdot a_0 \cdot l_0 + b_0 = 2 \cdot 0.000020617 \cdot 20 + 0.001518167 = 0.002342847$$

When $b_1$, $M_1$, $M_2$ and $l_1$ are substituted in the formula 18, $a_1$ is acquired as follows.

$$a_1 = \frac{(M_2 - M_1) - (b_1 \cdot l_1)}{l_1^2} =$$

$$\frac{(0.88019 - 0.85470) - 0.002342847 \cdot 10}{100} = 0.000020615$$

Next, in a step of final region gradient calculation 1404, a gradient of a magnification change at the boundary between the region 1 and the region 2 is acquired. Similarly as in the case of the above-described region 0, the following formula is obtained.

$$Pr_1'(l_1) = 2 \cdot a_1 \cdot l_1 + b_1 \quad \text{formula 19}$$

The formula 19 is used in coefficient calculation of a subsequent region.

<Regions 2 to 13>

As regards quadratic function coefficients $a_2$, $b_2$, $c_2$ to $a_{31}$, $b_{31}$, $c_{31}$ of regions 2 to 31 are acquired by calculation similar to that in the above-described region 1.

Thus, in the profile operation part 302, the pixel magnifications on the pixel unit basis are calculated using the magnifications (quadratic functions) for the respective regions set in advance. In this case, a characteristic feature is such that magnification gradients at the boundary between adjacent regions are made equal to each other. As a result, a magnification fluctuation is smoothly continuous, and therefore, occurrences of image moire and pseudo contour can be suppressed.

In the above, the preferred embodiment of the present invention was described. However, the present invention is not limited to the embodiment, but various modifications and changes can be made within a scope of the present invention.

Modified Embodiment 1

In the above-described embodiment, on the basis of the second magnification data in the respective segments, the pixel magnifications at the pixel positions in the segments are calculated using the curve functions depending on the respective segments, but the present invention is not limited thereto. For example, the pixel magnifications at the respective pixel positions may also be calculated using a single curve function with all the data of $M_0$ to $M_{31}$ as the second magnification data in the segments.

Modified Embodiment 2

Further, in the above-described embodiment, as the curve function, the quadratic function was used, but ternary or more functions may also be used. Further, the number of divided region (segments) is not limited to 32.

According to the present invention, it is possible to provide an image forming apparatus in which even in a constitution with a simple fθ lens and a constitution with no fθ lens, a high-quality image is capable of being formed by equalizing magnification differential values at a boundary of adjacent divided regions with respect to a scanning direction of a light beam.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-231518 filed on Dec. 1, 2017, which is hereby incorporated by reference herein in its entirety.

What is claimed is:

1. An image forming apparatus comprising:
a photosensitive member;
a light source configured to emit a light beam;
a deflecting unit configured to deflect the light beam so that said photosensitive member is scanned with the light beam emitted from said light source;
a storing unit configured to store magnification correction data set for each of a plurality of different scanning regions on said photosensitive member with respect to a scanning direction of the light beam;
a correcting unit configured to correct, on the basis of the magnification correction data stored in said storing unit, image data for each of scanning positions included in a region corresponding to the magnification correction data and configured to output a driving signal on the basis of corrected image data; and
a light source driving portion configured to drive said light source with the driving signal,
wherein the magnification correction data is determined using a quadratic function of a variable representing the scanning position with respect to the scanning direction,
wherein a result of an operation performed by the quadratic function represents a correction amount for correcting a magnification of a pixel formed at the scanning position corresponding to the variable, and
wherein coefficients of two quadratic functions corresponding to adjacent two regions included in the scanning regions are set so that a differential value calculated at the variable corresponding to a boundary of the two regions by a differential of the quadratic function for one region and a differential value calculated at the variable corresponding to the boundary of the two regions by a differential of the quadratic function for the other region are equal to each other.

2. An image forming apparatus according to claim 1, wherein when magnification data measured in each of the scanning regions is first magnification data and magnification data which is a reciprocal of the first magnification data is second magnification data, the magnification correction data is acquired on the basis of the second magnification data.

3. An image forming apparatus according to claim 2, wherein the first magnification data is acquired as a ratio of a scanning speed, to a reference scanning speed, calculated from a distance between sensors provided in the scanning regions and a time in which the optical beam passes through between the sensors.

4. An image forming apparatus according to claim 2, wherein in a mostupstream region of the scanning regions with respect to the scanning direction, the quadratic function is $f(x)=a_0 x^2 + b_0 x + c_0$, and coefficients $a_0$, $b_0$ and $c_0$ are specified on the basis of three values, of the second magnification data, corresponding to the scanning regions.

5. An image forming apparatus according to claim 4, wherein in the scanning regions excluding the mostupstream region with respect to the scanning direction, the quadratic function is $f(x)=a_n x^2 + b_n x + c_n$ (n: integer), and coefficients $a_n$, $b_n$ and $c_n$ are specified on the basis of two values, of the second magnification data, corresponding to the scanning regions and a differential value calculated by a differential form of the quadratic function in a boundary of the two regions adjacent on an upstream side and a variable controlling to the boundary of the two regions.

6. An image forming apparatus according to claim 1, wherein said correcting unit includes a pixel size calculating portion configured to calculate a size of each of pixels in the scanning regions.

7. An image forming apparatus according to claim 6, further comprising a look-up table for generating a PWM signal as a driving signal corresponding to the size of each of pixels calculated by said pixel size calculating portion and an image data value corresponding to each of pixels.

8. An image forming apparatus according to claim 7, wherein the size of each of pixels is an integral multiple of bit data which is clock-outputted as the PWM signal.

9. An image forming apparatus according to claim 7, wherein a reference size in each of pixels is determined depending on setting of a resolution per inch.

* * * * *